United States Patent
Meiler

(10) Patent No.: US 6,779,887 B2
(45) Date of Patent: Aug. 24, 2004

(54) ARRANGEMENT COMPRISING AN ENDPIECE, A TEMPLE, AND A HINGE FOR SPECTACLES

(75) Inventor: Ruedi Meiler, Schiers (CH)

(73) Assignee: Eye-Systems GmbH, Chur (CH)

( * ) Notice: Subject to any disclaimer, the term of this patent is extended or adjusted under 35 U.S.C. 154(b) by 0 days.

(21) Appl. No.: 10/456,108

(22) Filed: Jun. 5, 2003

(65) Prior Publication Data

US 2004/0032564 A1 Feb. 19, 2004

(30) Foreign Application Priority Data

Jun. 12, 2002 (DE) .......................................... 102 26 103

(51) Int. Cl.⁷ ................................................ G02C 5/22
(52) U.S. Cl. ...................... 351/153; 351/113; 351/121; 16/228
(58) Field of Search ................................ 351/113, 114, 351/119, 121, 153; 16/228

(56) References Cited

U.S. PATENT DOCUMENTS

| | | | |
|---|---|---|---|
| 4,932,771 A | * | 6/1990 | Nowottny .................... 351/113 |
| 6,139,143 A | | 10/2000 | Brune et al. |
| 6,145,985 A | | 11/2000 | De Marchi et al. |
| 2003/0090621 A1 | * | 5/2003 | Chai ........................... 351/153 |

FOREIGN PATENT DOCUMENTS

DE       29906260 U1    8/1999

* cited by examiner

*Primary Examiner*—Huy Mai
(74) *Attorney, Agent, or Firm*—Roth & Goldman, P.A.

(57) ABSTRACT

The arrangement comprises an endpiece (4), a temple (2), and a hinge for spectacles, said hinge joining the endpiece and the temple in an articulated manner such that the temple is pivotable relative to the endpiece between a position of non-use and a position of use. The temple has a free front surface on its end portion (14) adjacent to the endpiece, and the endpiece has an abutment surface on its end portion (26) adjacent to the temple. The surfaces abut on each other when the temple takes up its position of use, thereby preventing a pivoting movement of the temple beyond the position of use. The hinge is formed by an flexible tape (8) fastened with its one end (34) to the end portion of the temple and, with its other end (36), to the end portion of the endpiece, and extending from the inner side of the temple to the inner side of the endpiece. The temple, the endpiece, and the tape are manufactured in one piece by injection molding of an injection-moldable plastic material. When the temple takes up its position of use, a space (40) is provided between the tape and the contact area (38) of the arrangement in which the front surface and the abutment surface abut on each other.

12 Claims, 1 Drawing Sheet

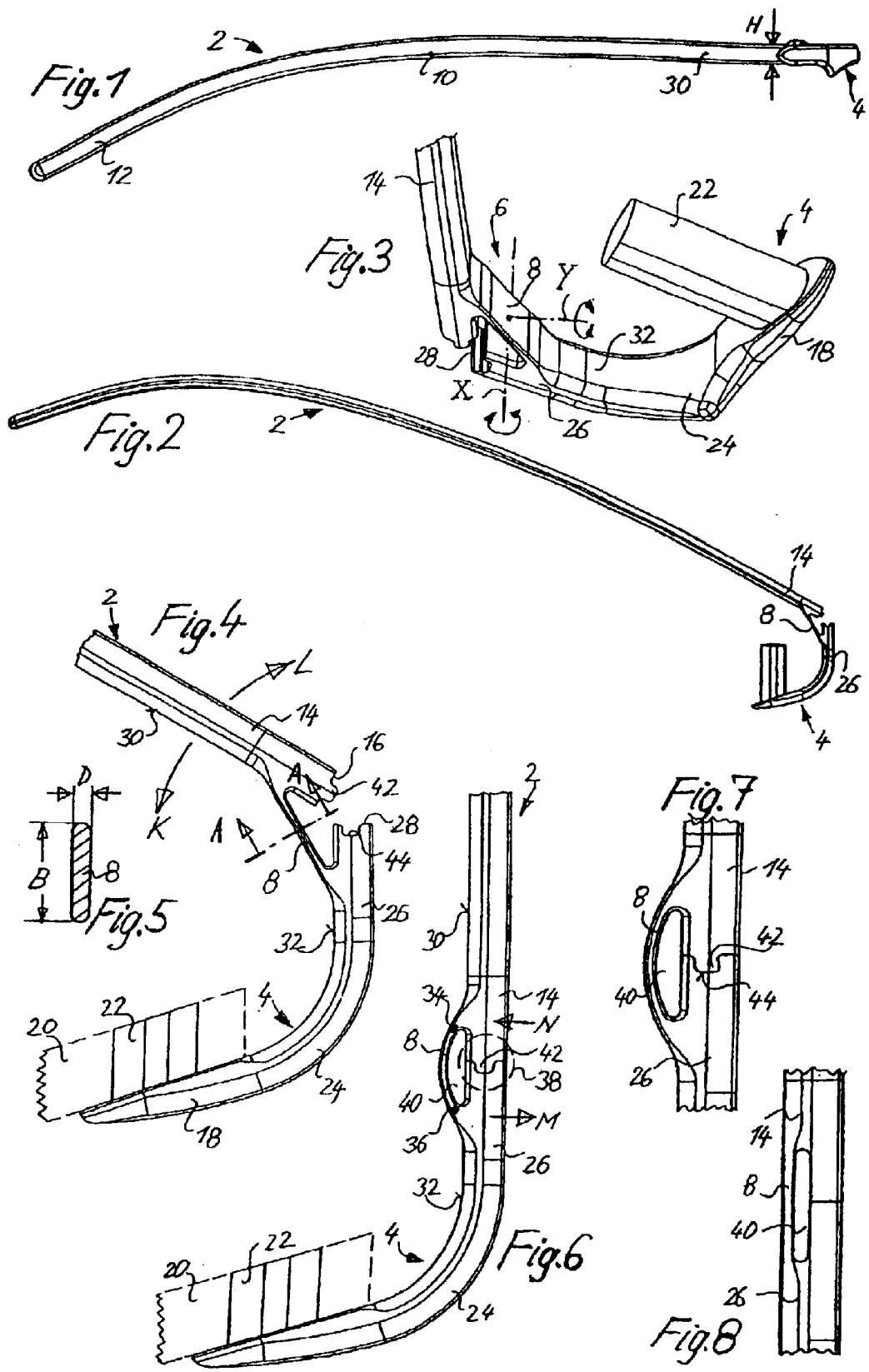

ARRANGEMENT COMPRISING AN ENDPIECE, A TEMPLE, AND A HINGE FOR SPECTACLES

The invention relates to an arrangement having an endpiece for spectacles, a temple for the spectacles, and a hinge according to the preamble of claim 1.

Such an arrangement is known (DE 197 21 306 A1). The known arrangement and, thus, also the arrangement according to the invention are provided for manufacturing spectacles from two of these arrangements and a spectacle center part comprising at least two spectacle lenses and a bridge. If the spectacles concerned are rimless spectacles, the endpiece of one of the two arrangements is suitably fastened to the edge portion facing away from the bridge of each of the two spectacle lenses in the course of the manufacture of the spectacles. If the spectacles concerned are spectacles having a full-rim frame or a semi-rim frame, the endpieces of the two arrangements are, in the course of the manufacture of the spectacles, suitably fastened to the full-rim frame or the semi-rim frame or, as the case may be, integrally formed therewith.

The hinge of the arrangement makes it possible to pivot the temple relative to the endpiece between a position of non-use and a position of use. The position of use of the temple is the position in which the temple is pivoted out relative to the center part of the spectacles and, thus, relative to the endpiece to such an extent that it extends from the center part of the spectacles in parallel to the side of the spectacle wearer's skull rearwards for contributing to holding the spectacles to the spectacle wearer's head. In its position of non-use, the temple is pivoted inwards into a position in which it extends substantially in parallel to the center part of the spectacles.

The hinge of the known arrangement comprises a hinge pin formed on the end portion of the temple adjoining the endpiece or on the end portion of the endpiece adjoining the temple, as well as a hinge eye formed on the respectively other end portion. The hinge pin extends through the hinge eye, so that the temple is pivotable about the axis of the hinge pin relative to the endpiece. When the temple takes up its position of use, the free front surface on the end portion of the temple adjoining the endpiece and the abutment surface on the end portion of the endpiece adjoining the temple abut on each other, thereby preventing that the temple can be pivoted outwards beyond its position of use. This means in other words that the free front surface and the abutment surface jointly determine the so-called aperture angle.

In the known arrangement, the endpiece including the hinge eye or the hinge pin consists of an injection-moldable plastic material and is accordingly manufactured by injection molding of the injection-moldable plastic material. Furthermore, in the known arrangement, also the temple including the hinge pin or the hinge eye consists of an injection-moldable plastic material and is accordingly manufactured by injection molding of the injection-moldable plastic material. In this way, the manufacture is simplified in comparison to such arrangements where the hinge pin is manufactured as a separate part and the arrangement is mounted by joining the endpiece, the temple, and the hinge pin together. The known arrangement requires, however, that, first of all, two components, namely the endpiece including the hinge eye or the hinge pin and the temple including the hinge pin or the hinge eye are separately manufactured by injection molding and are then connected to each other.

A known arrangement is also one comprising an endpiece, a temple, and a hinge for spectacles with the endpiece, the temple, and the hinge being unitarily formed, i.e. formed in one piece. In this known arrangement, the endpiece, the temple, and the hinge substantially consist of a metal wire which is flattened in the area of the hinge such that this flattened wire portion forms a flexible leaf spring. The temple is pivoted against the spring force of said leaf spring in its position of non-use as well as in its position of use. This known arrangement does not include any elements defining the position of use of the temple, so that this known arrangement does not allow keeping the center part of the spectacles reliably in its target position on the spectacle wearer's head.

The invention is based on the object of further developing the generic arrangement such that it can be manufactured in a simple way without its functional performance being adversely affected. In particular, it shall still be ensured that the position of use of the temple relative to the endpiece is reliably determined by the interaction of the free front surface and the abutment surface, so that the opened temple is kept in said determined position of use.

According to the invention, this object is achieved by the arrangement according to claim 1.

According to the device of the invention, it is provided that the hinge is formed by a flexible tape fastened with its one end to the end portion of the temple adjoining the endpiece and, with its other end, to the end portion of the endpiece adjoining the temple, that the temple, the endpiece, and the tape are formed as one unit, i.e. integrally or unitarily, that the tape extends from the inner side of the temple to the inner side of the endpiece, and that, when the temple takes up its position of use, there is a space between the tape and the area of the arrangement in which the free front surface of the temple and the abutment surface abut on each other.

The hinge of the arrangement according to the invention is formed by a flexible tape. "Tape" here refers to a material strip the thickness of which is small in comparison to its width. The temple, the endpiece, and the hinge formed by the flexible tape are integrally formed, namely by injection molding of the injection-moldable plastic material. This unitary formation by injection molding means that the temple, the endpiece, and the hinge, i.e. the whole arrangement, can be manufactured as coherent component in one single injection molding process. This considerably simplifies the manufacture of the arrangement, since only one instead of several components needs to be manufactured for producing the arrangement, and since no mounting of several components to form the arrangement is necessary.

The tape of the arrangement according to the invention extends from the inner side of the temple to the inner side of the endpiece, wherein there is a space between the tape and the area of the arrangement in which the free front surface of the temple and the abutment surface abut on each other when the temple takes up its position of use. This relative positioning of the tape, on the one hand, and of the contact area between the front surface and the abutment surface, on the other hand, allows a pivoting of the temple from its position of non-use, in which the end portions of endpiece and temple are exclusively connected by the tape and are not in contact otherwise, in the direction of its position of use, wherein, during this pivoting step, the tape is bent, which is possible due to its flexibility. During this pivoting step, the free front surface on the end portion of the temple and the abutment surface on the endpiece finally get in contact with each other, so that a further pivoting movement of the temple is not possible whereby the temple reaches and takes up its position of use.

The space between the tape, on the one hand, and the contact area between the free front surface and the abutment surface, on the other hand, ensures that the tape may have, between its ends, a length sufficient for giving the tape the necessary flexibility without making it necessary to form the tape to be particularly thin for achieving the required flexibility.

Advantageous embodiments of the invention are characterized in the subclaims.

Embodiments of the invention are shown in the drawings and will be explained in greater detail in the following.

FIG. 1 shows a lateral view of a preferred embodiment of the arrangement according to the invention, wherein the arrangement shown is an arrangement forming the left temple and the left endpiece of spectacles;

FIG. 2 shows a top view with respect to FIG. 1;

FIG. 3 shows, on an enlarged scale and viewed at an angle from below, a perspective view of the endpiece and of an end portion of the temple adjoining the endpiece of the arrangement according to FIGS. 1 and 2;

FIG. 4 shows, on an enlarged scale, the endpiece and the end portion of the temple of the arrangement adjoining the endpiece according to FIGS. 1 and 2 in a top view as in FIG. 2;

FIG. 5 shows a sectional view according to A-B in FIG. 4;

FIG. 6 shows a top view similar to FIG. 4, wherein the temple takes up its position of use—differently from FIG. 4;

FIG. 7 shows, in a representation similar to FIG. 6, a detail of a modification of the embodiment according to FIGS. 1 to 6; and FIG. 8 shows a detail of a second embodiment in a representation similar to FIG. 6.

In the following, a preferred embodiment of the arrangement according to the invention is explained by means of FIGS. 1 to 6.

The arrangement shown in FIGS. 1 to 6 consists of a temple 2, an endpiece 4, and a hinge 6 for joining the temple 2 and the endpiece 4 in an articulated manner, said hinge being formed by a flexible tape 8.

The temple 2 consists of an injection moldable plastic material and comprises a temple shaft 10, a temple endpiece 12 on the rear end of the temple shaft 10, and a front end portion 14 adjacent to the endpiece 4 at the front end of the temple shaft 10. On the end portion 14, there is provided a free front surface 16 extending in a substantially perpendicular way to the (non-represented) longitudinal axis of the temple 2.

The endpiece 4 consists of the same injection-moldable plastic material as the temple 2, and comprises a contact portion 18 meant for abutting on the front side of a marginal section of a spectacle lens 20 represented by broken lines in FIGS. 4 and 6. A pin 22 is formed on the contact portion 8 and is meant for being inserted into a hole in the spectacle lens 20 for joining the spectacle lens 20 and the endpiece together by means of the pin 22. The details of this connection between the spectacle lens 20 and the endpiece are without any meaning for the present invention and are, thus, not explained in detail here. However, reference shall be made to the fact that the pin 22, which is first manufactured so as to have the length shown in FIGS. 2 and 3 is trimmed within the course of the manufacture of the connection between the spectacle lens 20 and the endpiece 4 such that the front surface of the pin 22 extends so as to be flush with the rear side of the spectacle lens 20, as this is shown in FIGS. 4 and 6.

The endpiece 4 further comprises an arched portion 24 formed by elongation of the contact portion 18 and merging into a longitudinal end portion 26 of the endpiece 4, adjacent to the temple 2. At its free end, the end portion 26 comprises an abutment surface 28 extending in a substantially perpendicular manner to the (non-represented) longitudinal axis of the end portion 26.

The flexible tape 8 forming the hinge 6 is, on the one hand, connected to the end portion 14 of the temple 2 adjoining the endpiece and, on the other hand, to the end portion 26 of the endpiece 4 adjoining the temple. The tape 8 connects the end portions 16 and 26 to each other such that the temple 2 can be pivoted relative to the endpiece 4 into a position of non-use and a position of use of the temple 2. FIG. 4 is a top view of the temple 2 in an intermediate position between the position of non-use and the position of use. From the intermediate position shown in FIG. 4, the temple 2 can be pivoted into its position of non-use relative to the endpiece 4 due to the flexibility of the tape 8 in the direction of an arrow K, and can be pivoted into its position of use which it takes up in FIG. 6 in the direction of an arrow L. The surface covered by temple 2 in this pivoting movement is here designated as pivoting surface and substantially coincides with the plane of projection of FIGS. 4 and 6. The side of temple 2 which faces the endpiece 4 in the position of non-use of temple 2 is the inner side 30 of the temple, and the side of the endpiece 4 facing the temple in the position of non-use of the temple is the inner side 32 of the endpiece 4.

The tape 8 is a strip of material, consisting of the same injection-moldable plastic material as temple 2 and endpiece 4, and having a width B considerably larger than thickness D (see FIG. 5). In the shown embodiment, the cross-sectional profile of the tape 8 has the shape of a flat rectangle whose long sides extend in a substantially perpendicular manner to the pivoting surface covered by temple 2, as this is illustrated in FIGS. 4 and 5. The short sides of the rectangle are rounded off, as this is shown in FIG. 5. At its one end 34, indicated by a dot in FIG. 6, the tape 8 merges into the end portion 14 of the temple 2 and, at its other end 36, also indicated by a dot in FIG. 6, it merges into the end portion 26 of the endpiece 4. As particularly FIGS. 4 and 6 show, the tape 8 extends from the inner side 30 of the temple 2 to the inner side 32 of the endpiece 4. The length of the tape 8, i.e. the distance measured along the tape 8 between its two ends 34 and 36, usually ranges from 2 to 7 mm, and preferably from 3 to 5 mm. The width B of the tape 8 is substantially equal to the height H measured perpendicularly to the pivoting surface (see FIG. 1) of the end portion 14 of the temple 2 adjoining the endpiece.

To bring the temple 2 into its position of use, it is pivoted beyond the intermediate position shown in FIG. 4 in the direction of the arrow L until the free front surface 16 and abutment surface 28 get into contact with each other, i.e. abut on each other, as this is shown in FIG. 6, so that a further pivoting of the temple 2 in the direction of the arrow K is not possible and the temple is prevented from pivoting beyond its desired position of use. This pivoting of the temple 2 until its position of use is possible due to the flexibility of the tape 8, which has the arched shape shown in FIG. 6 when the temple 2 takes up its position of use.

In the shown embodiment, the two end portions 14 and 26 extend in a straight elongation of each other when the temple 2 takes up its position of use, as this is shown in FIG. 6. A material-free space 40 exists between the area of the arrangement in which the front surface 16 and the abutment surface 28 abut on each other, i.e. between the contact area 38 circled in a broken line in FIG. 6 and the tape 8; said space 40 approximately has the same length as the tape 8 in the direction of the (non-represented) longitudinal axes of temple 2 and end portion 26. The space 40 ensures that the tape 8 can be bent over its whole length, i.e. the distance between its two ends 34 and 36, without being hindered, so that it is sufficiently flexible without having to be formed in a very thin manner.

It has already been pointed out that the tape 8 extends from the inner side 30 of the temple 2 to the inner side 32 of the endpiece 4. Accordingly, the contact area 38 is arranged adjoining the tape 8 facing the outer sides of the temple 2 and the endpiece 4.

Due to the described geometry of the tape 8 and its positioning relative to the temple 2 and the endpiece 4, the tape 8 is resilient when it is loaded in the sense of a bending about an X axis extending in its direction of width (see FIG. 3). However, when the tape 8 is loaded in the sense of a bending about a Y axis which is perpendicular to the X axis, the tape does practically not give in, i.e. it is rigid against bendings about the Y axis. The larger this rigidity is, the larger is width B of the tape 8. Thus, in case of need, width B of the tape 8 may also be selected to be larger than height H of the end portion 14 of the temple 2 adjoining the endpiece. This rigidity is desired and useful, because it prevents displacements of the temple perpendicularly to its pivoting surface. The tape 8 is practically not flexible in its longitudinal direction, so that it counter-acts a pivoting of the temple 2 beyond its position of use.

As has already been mentioned, the temple 2, the endpiece 4, and the tape 8 forming the hinge 6 consist of the same injection-moldable plastic and are formed as one unit, i.e. integrally with each other. Accordingly, they can be manufactured as a coherent component by one injection-molding only. It has becomes apparent that the component, i.e. the whole arrangement consisting of the temple 2, the endpiece 4, and the tape 8, can be manufactured by injection molding, in that the die mold corresponding to the component is filled with the plastic material from the end corresponding to the temple endpiece 12. In this process, the molten plastic material flows through the section of the mold cavity corresponding to the tape 8 further into the section of the mold cavity corresponding to the endpiece 4. To avoid that this flow is throttled excessively, the surface of the cross-sectional profile of the section of the mold cavity corresponding to the tape 8 should not be too small. The thickness D of the tape 8 is fixed under this point of view. The decrease in the flexibility of the tape 8 when the thickness D increases can be compensated for by a suitable dimensioning of the length of the tape 8. FIGS. 1 and 2 show the arrangement in the state in which it leaves the mold cavity after the injection molding. Thus, FIGS. 1 and 2 simultaneously show the geometry of the mold cavity of the injection mold for injection-molding the arrangement.

In the represented embodiment of the invention, the free front surface 16 of the end portion 14 of the temple 2 is provided with a projection in the form of a ledge 42. Said ledge has flanks parallel to each other. The abutment surface 28 on the end portion 26 of the endpiece is provided with a recess in the form of a groove 44 which is shaped in a complementary manner to the ledge 42. The ledge 42 and the groove 44 are arranged such on the front surface 16 and the abutment surface 28, respectively, that they are engaged with each other, if the temple 2 takes up its position of use, as this is shown in FIG. 6. The ledge 42 and the groove 44 extend substantially in parallel to the direction of the width of the tape 8, i.e. perpendicularly to the plane of projection of FIGS. 4 and 6. The ledge 42 and the groove 44 jointly form a locking device which detachably locks the temple 2 and, the endpiece 4 to each other in the position of use of the temple 2 and prevents an undesired displacement of the two end portions 14 and 26 relative to each other in the direction of the arrows N and M in FIG. 6.

FIG. 7 shows a modification of the aforedescribed embodiment, wherein the modification merely consists in that the ledge 42 is wider at its head than at its foot and, accordingly, the groove is wider at its bottom than at its opening. In this way, the ledge 42 and the groove 44 form a snap connection. If the temple 2 is pivoted into its position of use, the ledge 42 snaps into the groove 44. In this way, the temple 2 is kept more reliably in its position of use against the restoring force of the tape 8, a force which—though small—does exist.

In the aforedescribed embodiment and its modification, the tape forming the hinge 6 has an arched shape when the temple 2 takes up its position of use. This bent form is, however, not absolutely necessary. FIG. 8 shows a second embodiment differing from the first embodiment in that the tape 8 substantially extends straight between the temple and the endpiece, so that, in the top view according to FIG. 8, the tape 8 does not cause a thickening of the arrangement. In the embodiment according to FIG. 8, no locking device as the one shown by the first embodiment in the shape of the ledge 42 and the groove 44 is provided.

In the aforedescribed embodiments, the end portions 14 and 26 extend from the temple and the endpiece substantially in a straight elongation of each other when the temple 2 takes up its position of use. This, however, is no necessary feature of the invention. Rather, the arrangement according to the invention may also be realized such that the (non-represented) longitudinal axis of the end portion 14 and the (non-represented) longitudinal axis of the end portion 26 form an angle smaller than 190° with each other.

The invention is not restricted to the particulars of the aforedescribed embodiments, but defined by the patent claims.

The arrangement comprises an endpiece 4, a temple 2, and a hinge 6 for spectacles, said hinge joining the endpiece and the temple in an articulated manner such that the temple is pivotable relative to the endpiece between a position of non-use and a position of use. The temple has a free front surface 16 on its end portion 14 adjacent to the endpiece, and the endpiece has an abutment surface 28 on its end portion 26 adjacent to the temple. These surfaces abut on each other when the temple takes up its position of use, thereby preventing a pivoting movement of the temple beyond the position of use. The hinge is formed by a flexible tape 8 fastened with its one end 34 to the end portion of the temple and, with its other end 36, to the end portion of the endpiece, and extending from the inner side of the temple to the inner side of the endpiece. The temple, the endpiece, and the tape are manufactured in one piece by injection molding of an injection-moldable plastic material. When the temple takes up its position of use, a space 40 is provided between the tape and the contact area 38 of the arrangement in which the front surface and the abutment surface abut on each other.

What is claimed is:

1. An arrangement having an endpiece (4) for spectacles, comprising a temple (2) for the spectacles and a hinge (6) for joining the endpiece and the temple in an articulated manner such that the temple is pivotable relative to the endpiece between a position of non-use and a position of use, wherein the side of the temple and the side of the endpiece facing each other in the position of non-use of the temple form the inner side (30) of the temple and the inner side (32) of the endpiece, wherein the temple has a free front surface (16) on its end portion (14) adjacent to the endpiece and, on its end portion (26) adjacent to the temple, the endpiece has an abutment surface (28) on which the free front surface of the temple abuts when the latter takes up its position of use, and wherein the temple, the endpiece and the hinge are manufactured by injection molding of an injection-moldable plastic material, characterized in that the hinge (6) is formed by a flexible tape (8) fastened with its one end (34) to the end portion (14) of the temple (2) and, with its other end (36), to the end portion (26) of the endpiece (4) adjoining the temple, that the temple, the endpiece and the tape are formed as one unit, that the tape extends from the inner side of the temple (30) to the inner side (32) of the endpiece, and that, when the temple takes up its position of use, a space (40) is provided between the tape and an area (38) of the arrangement in which the free front surface (16) of the temple and the abutment surface (28) of the endpiece abut on each other.

2. An arrangement according to claim 1, characterized in that the tape (8) has a cross-sectional profile in the form of a flat rectangle whose long sides extend substantially perpendicularly to a pivoting surface which the temple (2) covers when pivotally moving between its position of use and its position of non-use.

3. An arrangement according to claim 2, characterized in that the short sides of the rectangle are rounded off.

4. An arrangement according to claim 2 or 3, characterized in that the tape (8) has a width (B) which is substantially equal to the height (H), measured perpendicularly to the pivoting surface, of the end portion (14) of the temple (2) adjoining the endpiece.

5. An arrangement according to claim 1, characterized in that, when the temple (2) takes up its position of use, the tape (8) extends between the temple and the endpiece (4) in an arched manner.

6. An arrangement according to claim 1, characterized in that, when the temple (2) takes up its position of use, the tape (8) extends between the temple (2) and the endpiece (4) in a substantially straight manner.

7. An arrangement according to claim 5 or 6, characterized in that, when the temple (2) takes up its position of use, the end portions (14, 26) of temple and endpiece (4) extend in a substantially straight elongation of each other.

8. An arrangement according to claim 1, characterized in that, between its ends (34, 36), the tape (8) has a length ranging from 2 to 7 mm, preferably ranging from 3 to 5 mm.

9. An arrangement according to claim 1, characterized in that the front surface (16) of the temple (2) or the abutment surface (28) of the endpiece (4) is provided with a projection (42), and that the respectively other surface (abutment surface or front surface) is provided with a recess (44), the recess and the projection being formed and arranged such that they are engaged with each other when the front surface and the abutment surface abut on each other.

10. An arrangement according to claim 9, characterized in that the projection is formed by a ledge (42), and that the recess is formed by a groove (44) so as to be complementary to the ledge.

11. An arrangement according to claim 10, characterized in that the ledge (42) and the groove (44) extend substantially in parallel to the direction of the width of the tape (8).

12. An arrangement according to claim 9, characterized in that the projection (42) and the recess (44) form a detachable snap connection.

\* \* \* \* \*